(12) United States Patent
Kimura et al.

(10) Patent No.: US 7,191,870 B2
(45) Date of Patent: Mar. 20, 2007

(54) BREATHER APPARATUS FOR A POWER TRAIN OF VEHICLE

(75) Inventors: Kiyoshi Kimura, Saitama (JP); Seiichi Mogi, Saitama (JP); Kenji Morizumi, Saitama (JP); Takahiro Tsutsui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 527 days.

(21) Appl. No.: 10/626,598

(22) Filed: Jul. 25, 2003

(65) Prior Publication Data

US 2004/0195044 A1 Oct. 7, 2004

(30) Foreign Application Priority Data

Aug. 2, 2002 (JP) .............................. 2002-225693

(51) Int. Cl.
*F01M 8/11* (2006.01)
(52) U.S. Cl. ..................... 184/6.23; 74/606 R; 310/89
(58) Field of Classification Search .............. 184/6.23; 74/606 R, 607, 606 A; 475/149, 150; 310/90.5; 123/41.86
See application file for complete search history.

(56) References Cited

U.S. PATENT DOCUMENTS

| | | | | |
|---|---|---|---|---|
| 1,930,260 A | * | 10/1933 | Almen | .................... 123/90.12 |
| 2,531,319 A | * | 11/1950 | Briggs | ........................ 184/6.23 |
| 5,114,320 A | * | 5/1992 | Kabelitz et al. | ........ 417/423.13 |
| 5,186,278 A | * | 2/1993 | Ives et al. | .................. 184/6.23 |
| 5,205,848 A | * | 4/1993 | Blanc et al. | .................. 55/310 |
| 5,215,164 A | * | 6/1993 | Shibata | ....................... 184/6.13 |
| 5,579,744 A | * | 12/1996 | Trefz | ........................... 123/573 |
| 5,650,677 A | * | 7/1997 | Furukawa et al. | ............ 310/88 |
| 6,435,993 B1 | * | 8/2002 | Tada | ........................... 474/110 |
| 6,666,184 B2 | * | 12/2003 | Kurihara et al. | ........ 123/196 R |
| 6,719,096 B2 | * | 4/2004 | Mogi | ........................ 184/6.23 |
| 2003/0010311 A1 | * | 1/2003 | Kurihara et al. | ........ 123/196 R |

* cited by examiner

*Primary Examiner*—Richard Ridley
*Assistant Examiner*—Terence Boes
(74) *Attorney, Agent, or Firm*—Westerman, Hattori, Daniels & Adrian, LLP.

(57) ABSTRACT

A breather apparatus for a power train of vehicle is presented, which has a motor and a gear box connected to the motor, including a common case wall, first and second breather paths formed within the common case wall and a third breather path provided for communicating with both the first and second breather paths at an upper portion of the common case wall, and further communicating with the atmosphere. The apparatus has a feature that a blocking device is provided so that the lubricant coming through the second breather path can be prevented from entering the first breather path.

6 Claims, 8 Drawing Sheets

BREATHER APPARATUS FOR A POWER TRAIN OF VEHICLE

FIELD OF THE INVENTION

The present invention relates to a breather apparatus for a power train, namely a motor and a gear box, mounted on a vehicle driven by a motor.

BACKGROUND OF THE INVENTION

A breather apparatus is provided in a gear case housing a gear box such as a transmission. The apparatus releases the air from the gear box so that both the temperature and pressure of air can be controlled to be normal. In a vehicle driven by a motor such as an electric vehicle, a hybrid vehicle and the like, an additional breather apparatus is also provided in a motor case housing a motor so that the temperature and pressure of air in the motor case can be prevented from rising undesirably.

A conventional vehicle driven by a motor has employed a breather for a gear case and a motor case respectively, thereby causing an increase in the dimensions of each case. However, a vehicle with a fuel cell, which needs to house a super charger and a large radiator in an engine room where gear and motor cases are also installed, has required each case to be compact as much as possible.

SUMMARY OF THE INVENTION

The object of the present invention is to provide a breather apparatus for a power train of vehicle driven by a motor, which enables downsizing of gear and motor cases.

The present invention provides a breather apparatus for a power train of vehicle, which has a motor and a gear box connected to the motor, including a common case wall, first and second breather paths formed within the common case wall and a third breather path provided for communicating with both the first and second breather paths at an upper portion of the common case wall, and further communicating with the atmosphere. The apparatus has a feature that a blocking device is provided so that the lubricant coming through the second breather path can be prevented from entering the first breather path.

The apparatus described above, which has the first and second breather paths both communicating with the third breather path, can release the air from both motor and gear cases without providing an independent breather path for each of the cases. Since the second breather path communicates with the oil separation chamber, the apparatus can separate the lubricant scattered by gears in a gear box, thereby preventing the lubricant from entering the second breather path. Even if lubricant enters the third breather path as oil mist via the second breather path, the blocking device is able to prevent the lubricant turned to oil droplets from entering the first breather path.

The present invention also provides an apparatus, in which the third breather path is formed within a cover wall of a terminal cover. And the blocking device, which is provided at a joint between the cover wall and the common case wall, has an oil return section for guiding the lubricant coming through the third breather path to the second breather path.

The aforementioned apparatus has also an advantage. Even if the lubricant enters the third breather path as oil mist from the oil separation chamber via the second breather path, the apparatus is able to return the lubricant turned to oil droplets to the second breather path with the oil return section.

The present invention further provides an apparatus, in which the third breather path is formed within a cover wall of a terminal cover. And the blocking device, which is provided at a joint between the cover wall and the common case wall, has an oil trap for preventing the lubricant coming through the second breather path from entering the third breather path.

The apparatus of the present invention further has an advantage. Even if the lubricant moves toward the third breather path as oil mist from the oil separation chamber via the second breather path, the apparatus is able to prevent the lubricant from entering the third breather path with the oil trap.

DESCRIPTION OF THE PREFERRED EMBODIMENTS a. First Embodiment

Figure 1:
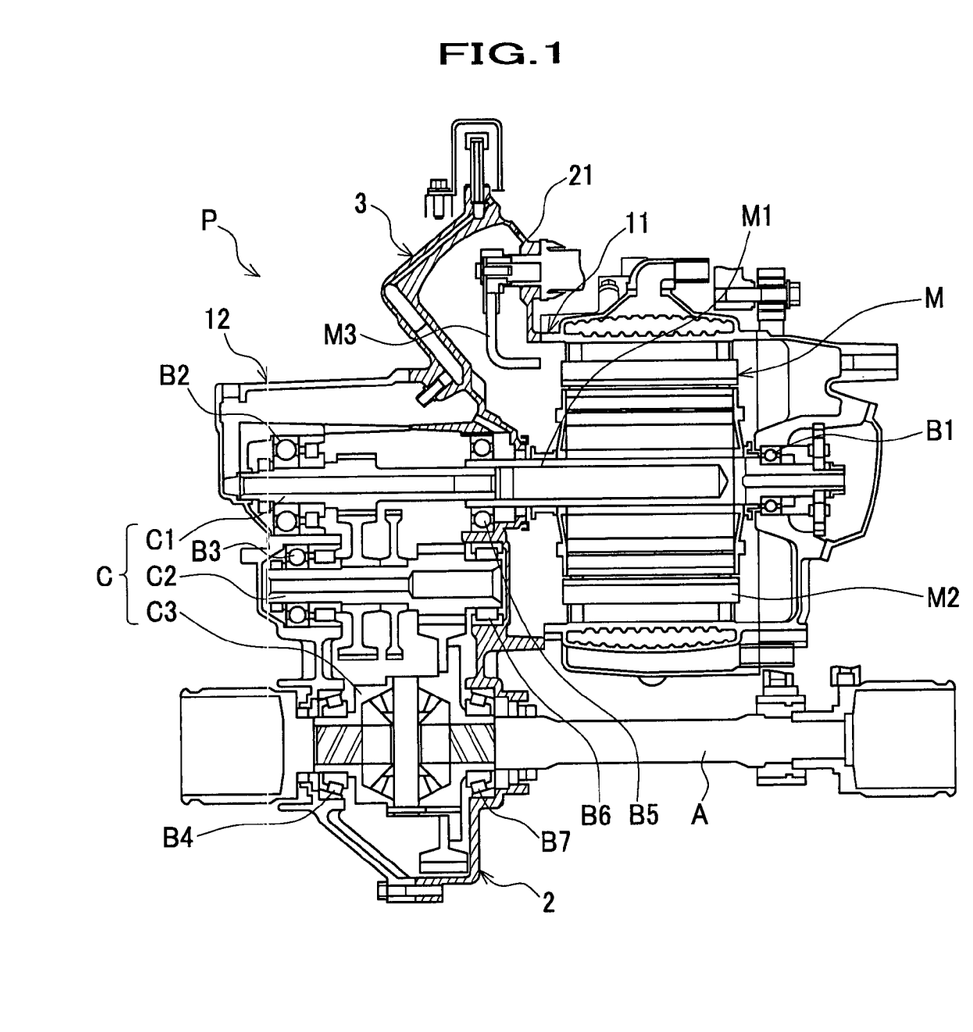
FIG. 1 is a sectional view showing a power train for vehicle according to the first embodiment.
Figure 2A:
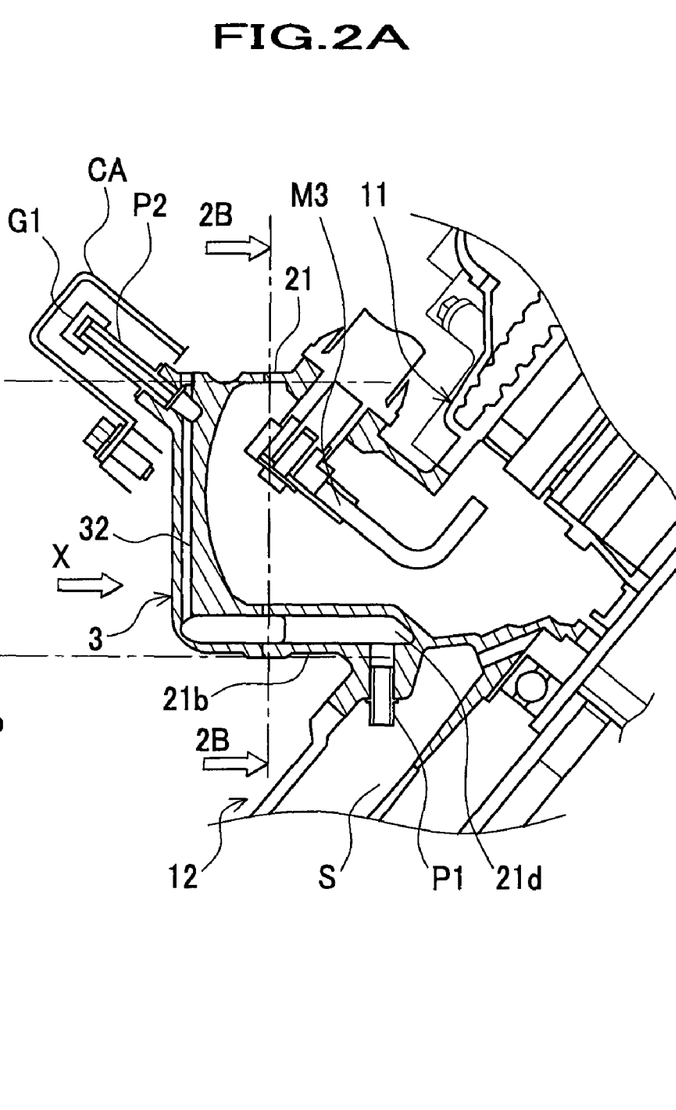
FIG. 2A is an enlarged sectional view showing the details of main part of a terminal box shown in FIG. 1.
Figure 2B:
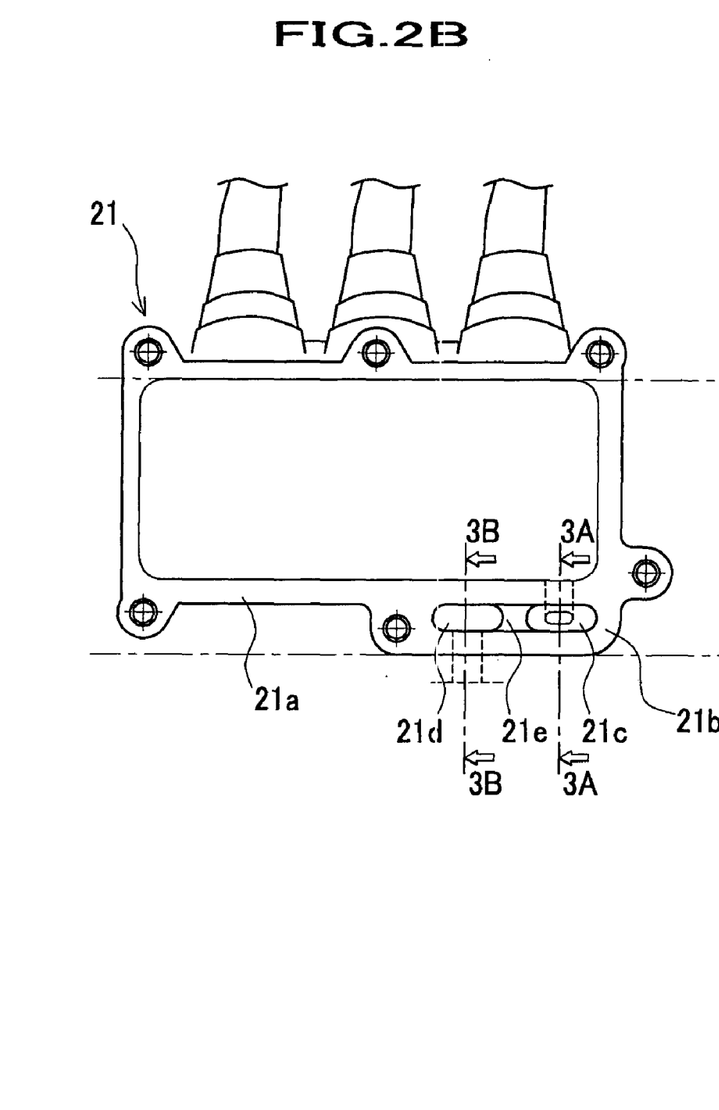
FIG. 2B is a sectional view taken along line 2B—2B of FIG. 2A.
Figure 3A:
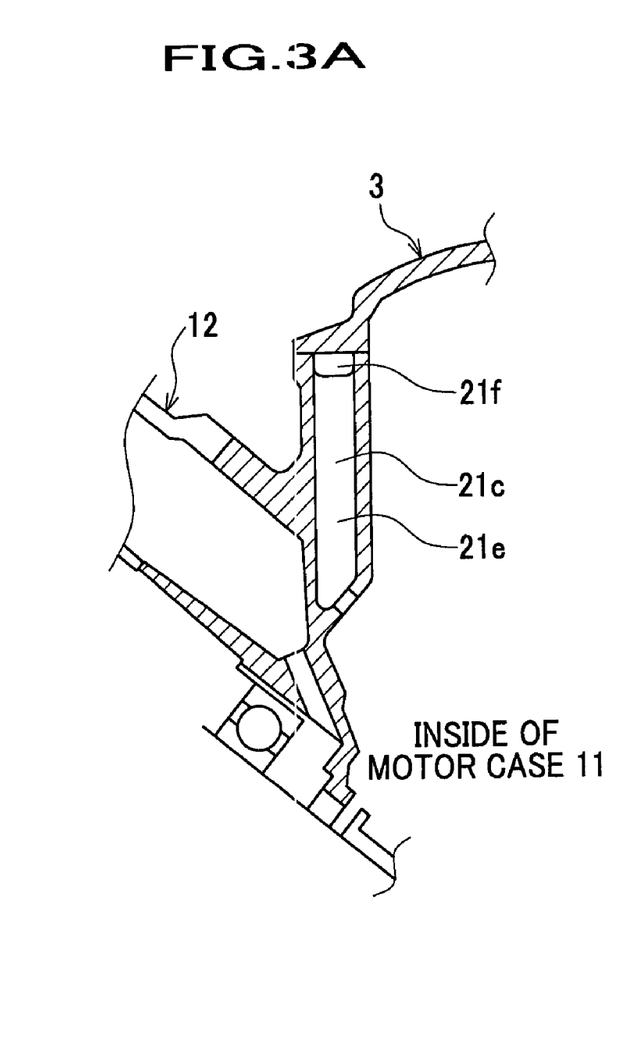
FIG. 3A is a sectional view taken along line 3A—3A of FIG. 2B.
Figure 3B:
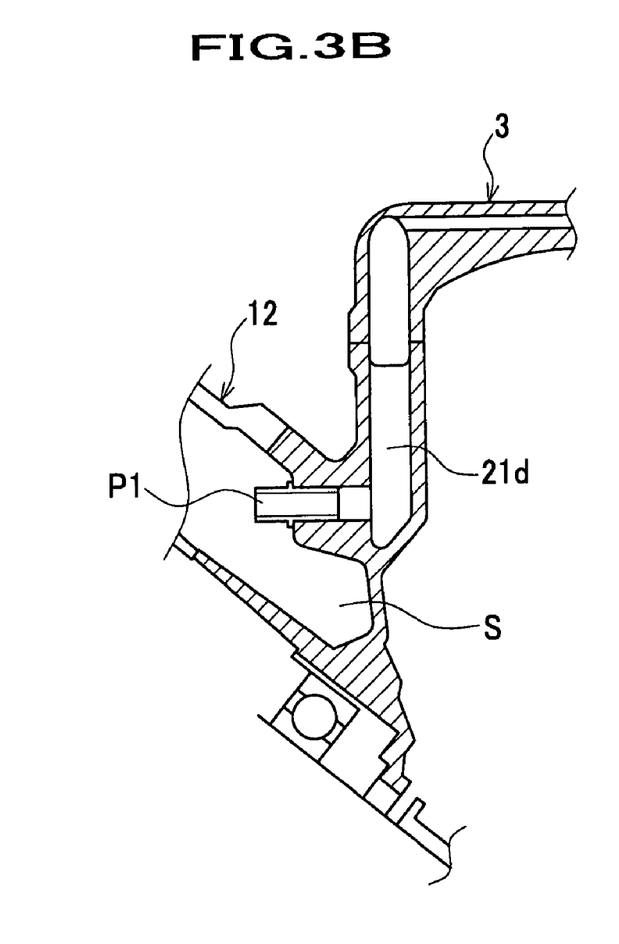
FIG. 3B is a sectional view taken along line 3B—3B of FIG. 2B.
Figure 4A:
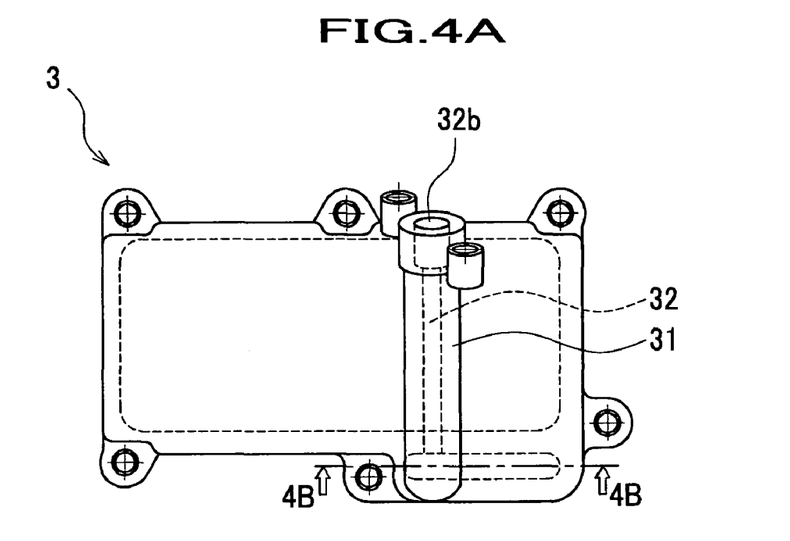
FIG. 4A is a view seeing a cover element in the direction of an arrow X in FIG. 2A.
Figure 4B:
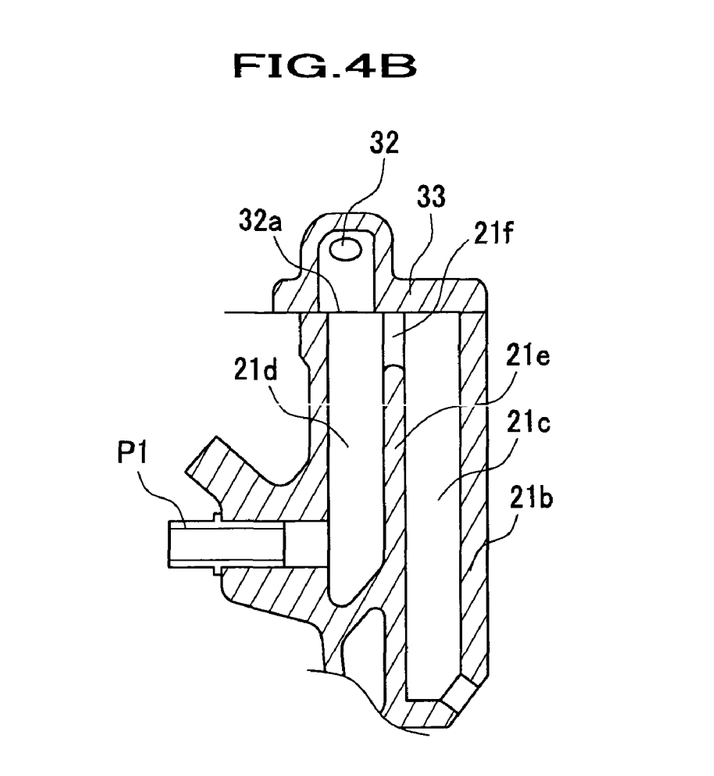
FIG. 4B is a sectional view taken along line 4B—4B of FIG. 4A.

A breather apparatus for a power train of vehicle according to a first embodiment of the present invention is now described in detail referring to the accompanying drawings. FIG. 1 is a sectional view showing a power train for vehicle according to the first embodiment. FIG. 2A is an enlarged sectional view showing the details of main part of a terminal box shown in FIG. 1. FIG. 2B is a sectional view taken along line 2B—2B of FIG. 2A. FIG. 3A is a sectional view taken along line 3A—3A of FIG. 2B. FIG. 3B is a sectional view taken along line 3B—3B of FIG. 2B. FIG. 4A is a view seeing a cover element in the direction of an arrow X in FIG. 2A. FIG. 4B is a sectional view taken along line 4B—4B of FIG. 4A.

As shown in FIG. 1, a power train P for vehicle has a motor M and a gear box C mechanically connected thereto. The gear box C includes an input shaft C1 connected to an end of a rotational shaft M1 of the motor M, a middle shaft C2 having reduction gears engaging with gears formed on required positions of the input shaft C1, and a differential gear unit C3 for transmitting torque from the middle shaft C2 to an axle shaft A. The motor M is housed in a motor case 11 and the gear box C is housed in a gear case 12. The motor case 11 and gear case 12 are jointed at a common case wall 2, which is shared by the motor and gear cases 11 and 12 as a part of each case. A gear case refers to a case to house a power transmission apparatus (gear box) including a one-stage transmission, a multi-stage transmission and a continuously valuable transmission.

The motor case 11, which has a bearing B1 so as to support rotatably an end of the rotational shaft M1 of motor M, covers a main body M2 of motor M thoroughly.

The gear case 12 has a bearing B2 to rotatably support an end of the input shaft C1, a bearing B3 to rotatably support an end of the middle shaft C2 and a bearing B4 to rotatably support an end of the differential gear unit C3 of gear box C. And the gear case 12 covers a part of the gear box C.

The common case wall 2 has a bearing B5 to rotatably support the other end of the input shaft C1, a bearing B6 to rotatably support the other end of the middle shaft C2 and a bearing B7 to rotatably support the other end of the differential gear unit C3 of gear box C. The common case wall 2 also has a terminal box 21 on its top, which communicates with the inside of motor case 11. On the top of terminal box 21 a cover element 3 is installed to cover a terminal M3 of motor M, which is exposed through an opening of terminal box 21. The terminal box 21 is formed integrally with the common case wall 2, tilted in a direction of the gear case 12 so that routing of harnesses can be done easily.

As shown in FIGS. 2A and 2B, the terminal box 21 has a thick wall portion 21b in a wall 21a lying near the gear case 12. A first breather path 21c (see FIG. 3A) communicating with the inside of motor case 11 and a second breather path 21d (see FIG. 3B) communicating with an oil separation chamber S in the gear case 12 are formed inside the thick wall portion 21b, interposing a separation rib 21e. A connecting path 21f serving as an oil return section (see FIG. 3A) communicating the first and second breather paths 21c and 21d is formed in the upper portion of separation rib 21e. A pipe P1 is connected to the bottom of second breather path 21d.

As shown in FIG. 4A, the cover element 3 has a protruded portion 31 in which a third breather path 32 is formed. As shown in FIG. 4B, the third breather path 32 communicates with both the first and second breather paths 21c and 21d at the upper part of thick wall portion 21b, and also communicates with the atmosphere. Specifically, the first breather path 21c communicates with the third breather path 32 via the connecting path 21f and the second breather path 21d. An opening 32a of the third breather path 32 located in the lower portion thereof is formed to be approximately coaxial with the second breather path 21d. And a pipe P2 shown in FIG. 2A, which serves as a breather opening to the atmosphere, is attached to an opening 32b located in the upper portion of third breather path 32. A rubber cap G1 is installed on the top of the pipe P2 so that the external water can be prevented from entering the pipe P2 and the air can be released through the pipe P2 to the atmosphere. Further, a cap CA for protection against the external water is installed around the rubber cap G1 with a gap, which allows discharging of the air. As shown in FIG. 1, the highest portion of a power train P is selected for a mounting position for the pipe P2 and the like.

A base wall 33 of the cover element 3, which contacts tightly to the upper opening of the first breather path 21c and the connecting path 21f, can guide the lubricant, which has entered the third breather path 32 as oil mist from the second breather path 21d and turns to oil droplets, back to the second breather path 21d. Specifically, the base wall 33 is positioned so that an inner surface of the base wall 33 facing the third breather path 32 is approximately flush with a surface of the second breather path 21d on the separation rib 21e or lies ahead towards the center of the second breather path 21d. The base wall 33 can thereby prevent the lubricant, which flows from the third breather path 32, from entering the connecting path 21f. In this way, the base wall 33 serves as an oil return section. The directions of pipe P1 and an opening on the bottom of the first breather path 21c shown in FIG. 4B are different from those shown in FIGS. 3A and 3B. This modification is made to provide better visual explanation of the first and second breather paths 21c and 21d.

It will now be appreciated from the foregoing description that the present invention is not limited to the particularly illustrated embodiment discussed above and may be carried out in various modified forms. For example, it may be possible to adapt the base wall 33 so that the surface of base wall 33 facing the third breather path 32 recedes towards the first breather path 21c, as long as the base wall 33 closes an upper opening of the first breather path 21c. The lubricant flowing from the third breather path 32 hits the separation rib 21e and then is returned to the second breather path 21d.

The function of a breather apparatus is now described, which includes a first breather path 21c, a second breather path 21d, a third breather path 32 and a base wall 33 serving as an oil return section.

When a vehicle (not shown) driven by a motor has been in operation for hours, a motor M and a gear box C shown in FIG. 1 generate heat, resulting in high temperature and pressure of the air in a motor case 11 and a gear case 12. As shown in FIG. 4A, the air of high temperature and pressure in the motor case 11 moves into a cap CA via a first breather path 21c, a connecting path 21f, a second breather path 21d, a third breather path 32 and a pipe P2 (see FIG. 2). The air moved into the cap CA is released to the atmosphere via a gap under the cap CA.

As shown in FIG. 2, the air of high temperature and pressure in the gear case 12 moves into an oil separation chamber S. This air then moves into the cap CA via a pipe P1, the second breather path 21d, the third breather path 32 and the pipe P2. The air is finally released to the atmosphere via the gap under the cap CA in the same manner as that of the air in the motor case 11. In the gear case 12, the rotation of input and middle shafts C1 and C2 scatters a lubricant. If the lubricant enters the oil separation chamber S, only the air moves into the second breather path 21d, since the lubricant and air are separated in the oil separation chamber S.

Even if the lubricant enters the third breather path 32 as oil mist from the oil separation chamber S via the second breather path 21d, the lubricant is forced to return to the second breather path 21d in the following manner. As shown in FIG. 4B, a surface of a base wall 33 facing the second breather path 21d prevents the lubricant, which falls from the third breather path 32 as oil droplets, from entering the connecting path 21f. In this way, the lubricant is returned to the second breather path 21d. Further, even if the lubricant enters the connecting path 21f, the lubricant hits the connecting path 21f, which is formed substantially horizontal, and is thereby returned to the second breather path 21d.

When a vehicle is brought to a stop after hours of operation under low temperature conditions, the condensation possibly occurring at an open end for the atmosphere can be prevented. The first and second breather paths 21c and 21d, which are formed in the common case wall 2 shared by the motor and gear cases 11 and 12, continuously receive heat therefrom through the common wall 2. In this way, the temperature of air in the third breather path 32, which communicates with both the first and second breather paths 21c and 21d, falls gradually and thereby the condensation can be prevented.

The first embodiment described above can achieve the advantages below. Since the air in the motor and gear cases 11 and 12 can be released to the atmosphere via the third breather path 32 shared by the two cases, it is possible to make the motor and gear cases 11 and 12 compact. Also the communication between the second breather path 21d and oil separation chamber S enables separation of the lubricant scattered in the gear case 12, thereby preventing the lubricant from entering the second breather path 21d. Furthermore, even if the lubricant enters the third breather path 32 as oil mist via the second breather path 21d, one of the base wall 33 and connecting path 21f can prevent the lubricant from entering the first breather path 21c serving as an oil return section.

In this connection, since the pipe P2 serving as a breather opening to the atmosphere is disposed on the top of a power train P, it is possible to provide protection against external water by keeping a sufficient height relative to the ground.

b. Second Embodiment

Figure 5A:
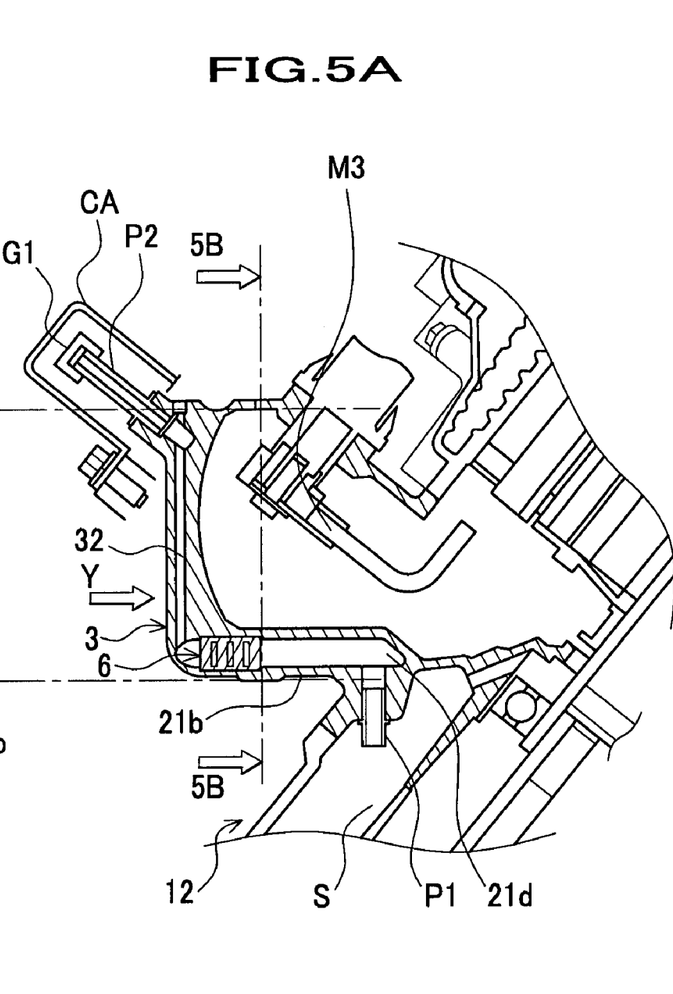
FIG. 5A is an enlarged sectional view showing the details of main part of a terminal box according to the second embodiment.
Figure 5B:
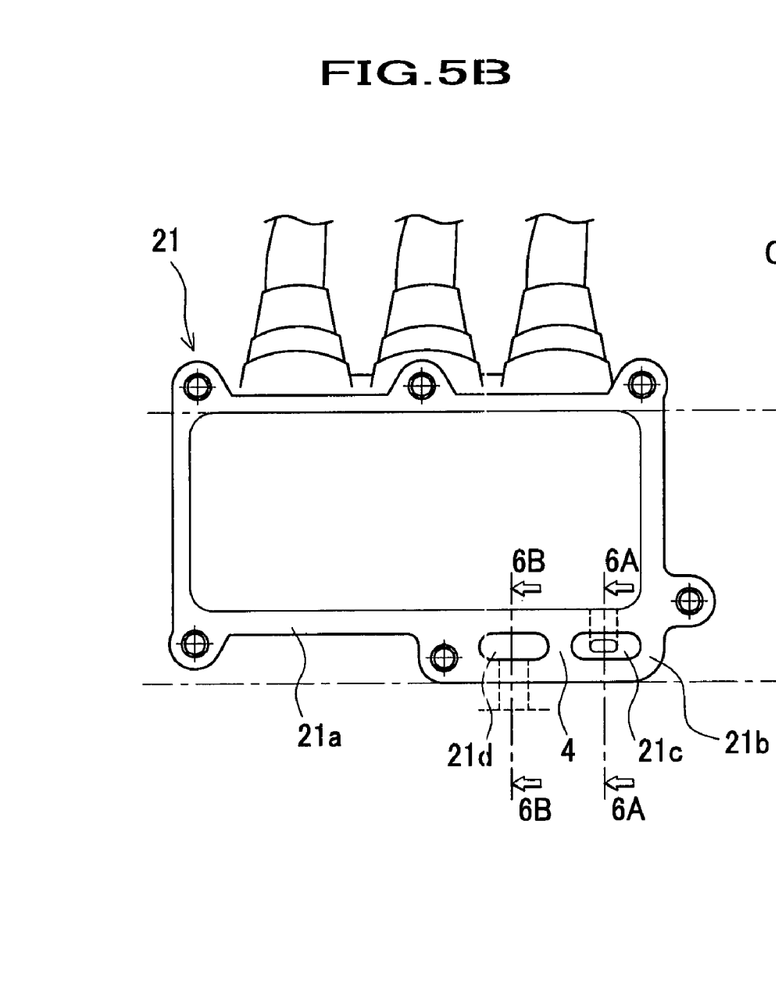
FIG. 5B is a sectional view taken along line 5B—5B of FIG. 5A.
Figure 6A:
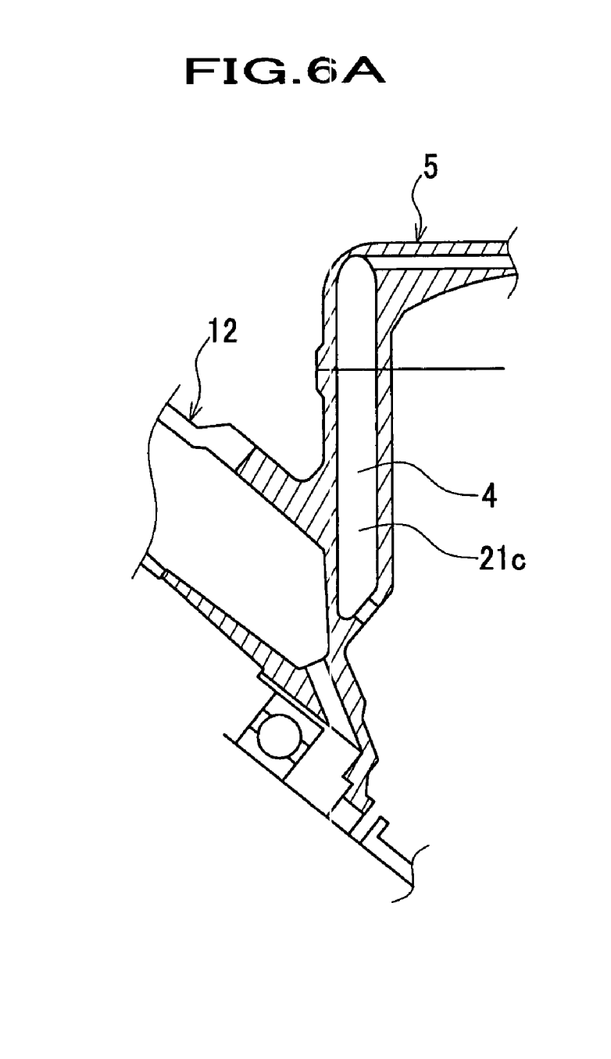
FIG. 6A is a sectional view taken along line 6A—6A of FIG. 5B.
Figure 6B:
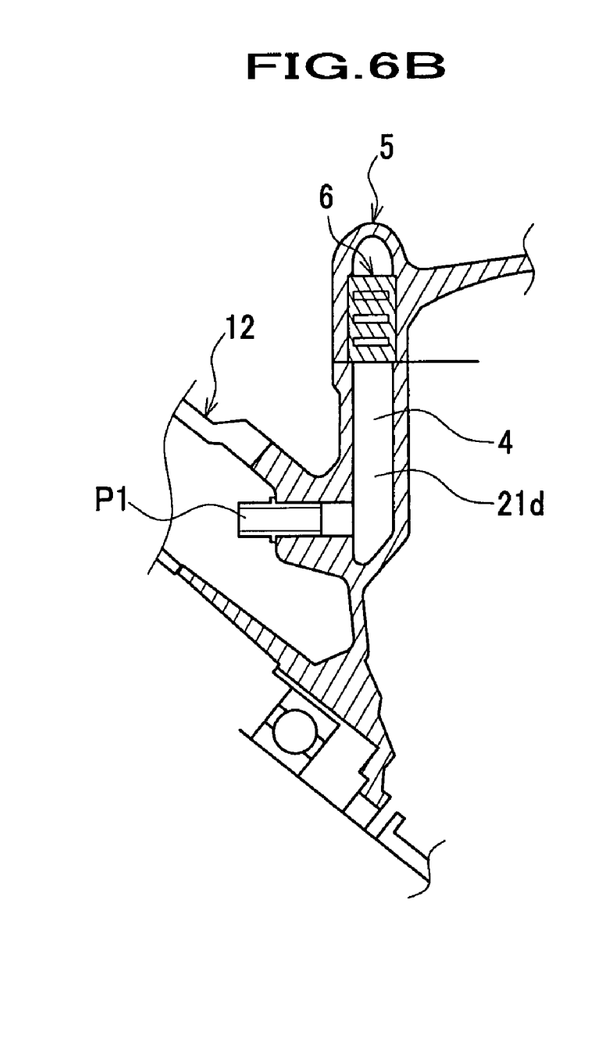
FIG. 6B is a sectional view taken along line 6B—6B of FIG. 5B.
Figure 7A:
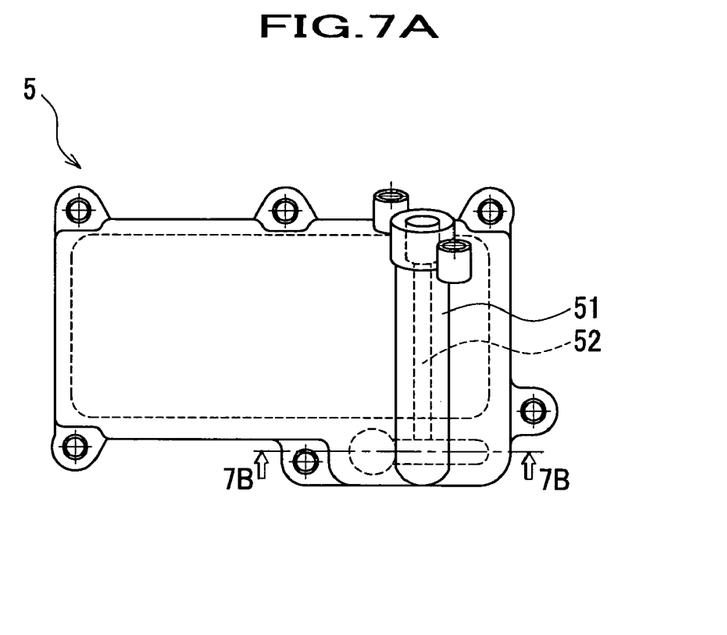
FIG. 7A is a view seeing a cover element in the direction of an arrow Y in FIG. 5A.
Figure 7B:
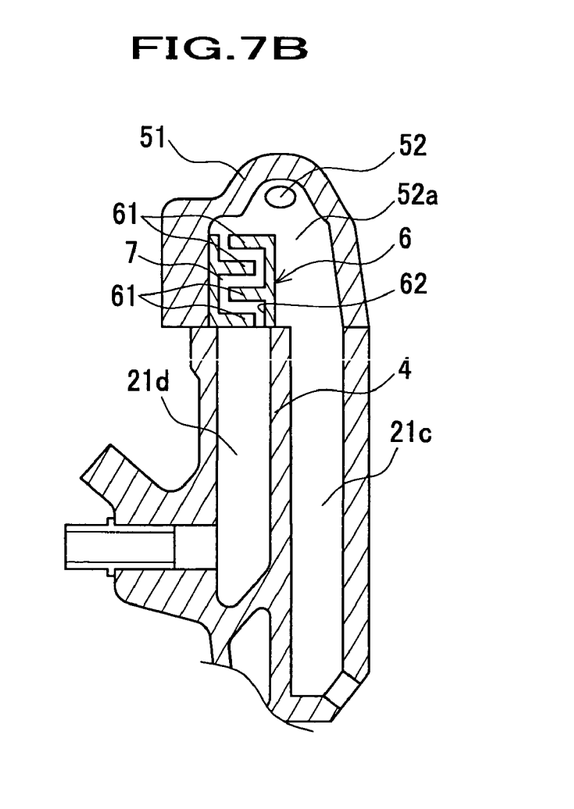
FIG. 7B is a sectional view taken along line 7B—7B of FIG. 7A.

A breather apparatus for a power train of vehicle according to a second embodiment is described. Description is omitted for the items which are the same as those described in the first embodiment, bearing the same symbols. FIG. 5A is an enlarged sectional view showing the details of main part of a terminal box according to the second embodiment. FIG. 5B is a sectional view taken along line 5B—5B of FIG. 5A. FIG. 6A is a sectional view taken along line 6A—6A of FIG. 5B. FIG. 6B is a sectional view taken along line 6B—6B of FIG. 5B. FIG. 7A is a view seeing a cover element in the direction of an arrow Y in FIG. 5A. FIG. 7B is a sectional view taken along line 7B—7B of FIG. 7A.

As shown in FIGS. 5B, 6A and 6B, the top surface of a separation rib 4, which separates a first breather path 21c from a second breather path 21d, is formed to be flush with another top surface of a wall 21a. In other words, the separation rib 4 does not have a connecting path 21f described in the first embodiment.

As shown in FIG. 7A, a cover element 5 has a protruded portion 51 that is positioned on the separation rib 4 when the cover element 5 is mounted on a terminal box 21. As shown in FIG. 7B, a third breather path 52 formed in the protruded portion 51, which has an opening 52a covering the first and second breather paths 21c and 21d, communicates with these breather paths 21c and 21d. An oil trap 6 serving as a blocking device is installed in the opening 52a so that the oil trap closes an upper opening of the second breather path 21d.

The oil trap 6 has a substantially cylinder-like shape. In an inner space 7 of the oil trap 6, four walls 61 are positioned in a geometrically predetermined manner so that a bent flow path is formed. To be more specific, each wall 61 projects from an inner surface 62 so that a gap between the end of wall 61 and the inner surface 62 can be formed alternately relative to the center axis of oil trap 6. In this way, the oil trap 6 prevents a lubricant, which comes from the second breather path 21d as oil mist, from entering the third breather path 52.

The breather apparatus for a power train of vehicle according to the second embodiment can accomplish advantages. The oil trap 6, which has the bent flow path with the walls 61, can prevent the lubricant from entering the third breather path 52, thereby restraining the lubricant from entering the first breather path 21c, which communicates with the third breather path 52.

It will now be appreciated from the foregoing description that the present invention is not limited to the particularly illustrated embodiments discussed above and may be carried out in various modified forms.

It is not limited to a breather apparatus according to the first embodiment, which employs an approximately horizontal connecting path 21f serving as an oil return section. For example, it may be possible to tilt the connecting path 21f so that the connecting path 21f can assist a lubricant falling from the third breather path 32 as oil droplets to return to the second breather path 21d.

It may be possible to select other types of blocking device other than a connecting path 21f in a terminal box 21 according to the first embodiment and an oil trap 6 in a cover element 5 according to the second embodiment as long as a blocking device is provided in a joint between a cover wall and a common case wall. For example, it may be possible to provide a connecting path (oil return section) 21f in a cover element 3 and an oil trap 6 in a terminal box 21.

Figure 8:
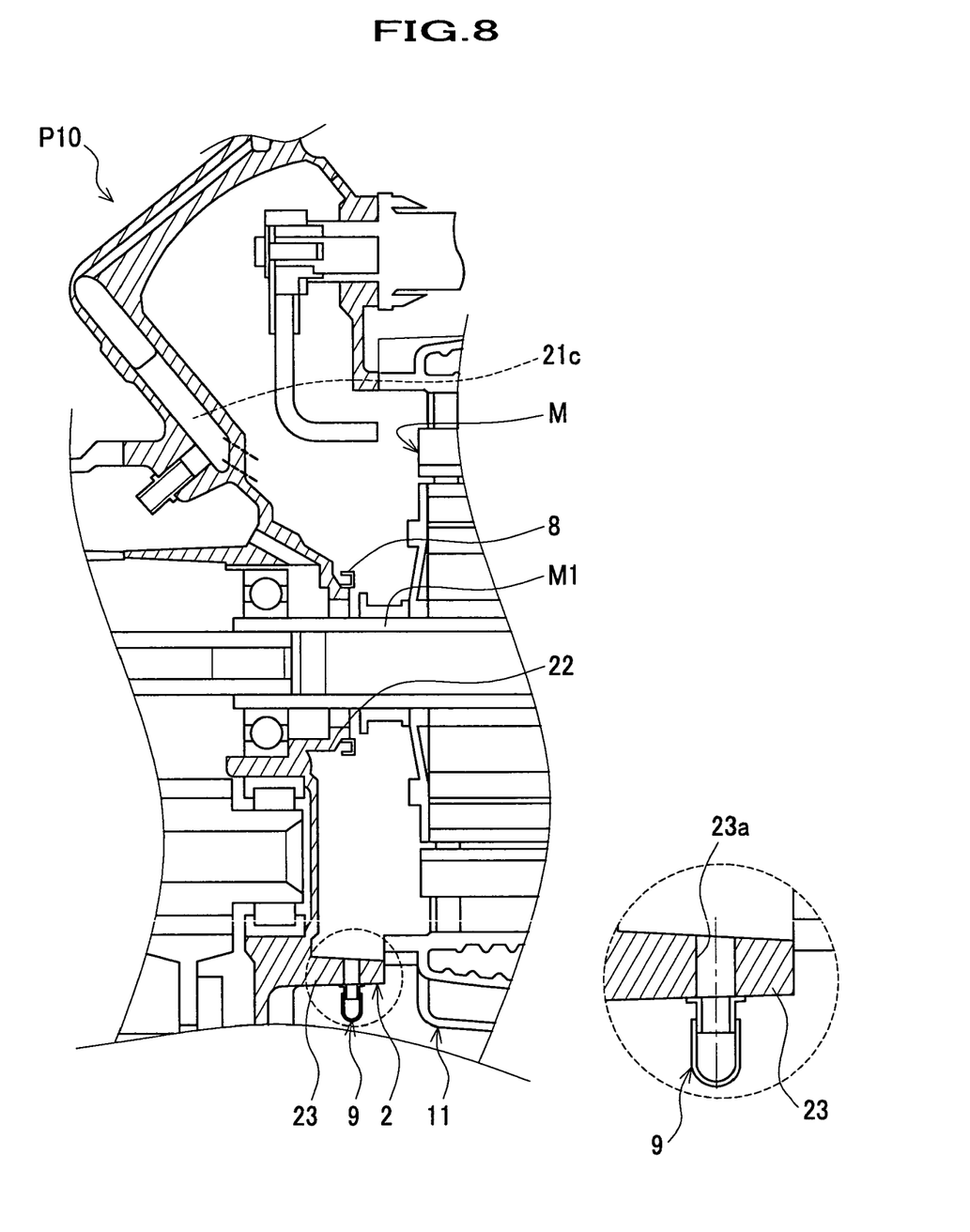
FIG. 8 is an enlarged sectional view showing the main part of a power train of vehicle of another embodiment according to the present invention.

A power train for vehicle, onto which a breather apparatus is mounted, is not limited to that described in the embodiments of the present invention. For example, a breather apparatus according to the first or second embodiment may be mounted on a power train P10 shown in FIG. 8. The power train P10 has a labyrinth flange 8, which bypasses a lubricant to a wall 22 surrounding a rotational shaft M1 of a motor M and drops the lubricant downward, and has a check plug 9 at a bottom wall 23 of a common case wall 2 inside a motor case 11. If a fluid such as water or oil enters the motor case 11 from a first breather path 21c, the arrangement described above makes the fluid fall through the labyrinth flange 8, thereby providing protection against scattering of the fluid caused by the rotation of rotational shaft M1. In this way, the motor M is protected from adverse effect resulting from splashes of the fluid. The bottom wall 23 has a through hall 23a with a check plug 9, by which checking of whether or not a fluid enters the motor case 11 can be done. Any plug may be used for the plug 9 as long as its inside can be seen, such as a plug made of transparent resin.

It is not limited to an oil trap 6 according to the second embodiment, which employs a bent flow path with walls 61 disposed inside the oil trap 6. Any trap capable of blocking a lubricant so that it cannot enter a third breather path 52 as oil mist from a second breather path 21d may be selected as an alternative. For example, a flow path configured like a spiral or meshes may be adopted.

What is claimed is:

1. A breather system for a power train of a vehicle comprising:

An electric motor and a gear box connected to the electric motor;

A common case wall adapted to form both a part of a motor case of the electric motor and part of a gear case of the gear box;

a first breather path formed within the common case wall for communicating with the inside of the motor case;

a second breather path formed within the common case wall for communicating with a separation chamber formed within the gear case for separating a lubricant; and a third breather path provided for communicating with both the first and second breather paths at an upper portion of the common case wall, and further communicating with the atmosphere,
wherein a blocking device is provided so that the lubricant coming through the second breather path can be prevented from entering the first breather path.

2. The system according to claim 1, wherein the third breather path is formed within a cover wall of a terminal cover which covers a terminal of the electric motor, and the blocking device, which is provided at a joint between the cover wall and the common case wall, comprises an oil return section for guiding the lubricant coming through the third breather path to the second breather path.

3. The system according to claim 1, wherein the third breather path is formed within a cover wall of a terminal cover which covers a terminal of the electric motor, and the blocking device, which is provided at a joint between the cover wall and the common case wall, comprises an oil trap for preventing the lubricant coming through the second breather path from entering the third breather path.

4. The system according to claim 3 wherein the oil trap comprises a bent flow path so as to trap lubricant.

5. The system according to claim 3 wherein the oil trap comprises a spiral flow path so as to trap lubricant.

6. The system according to claim 3 wherein the oil trap comprises a mesh flow path so as to trap lubricant.

* * * * *